Oct. 8, 1946.                      C. E. McCOY                         2,409,142
                                MOLDING APPARATUS
                              Filed Feb. 11, 1942                   2 Sheets-Sheet 1

INVENTOR
C. E. McCOY
BY Harry C. Duft
ATTORNEY

Oct. 8, 1946.　　　C. E. McCOY　　　2,409,142
MOLDING APPARATUS
Filed Feb. 11, 1942　　　2 Sheets-Sheet 2

INVENTOR
C. E. McCOY
BY Harry R. Swift
ATTORNEY

Patented Oct. 8, 1946

2,409,142

UNITED STATES PATENT OFFICE 2,409,142

MOLDING APPARATUS

Clarence E. McCoy, Western Springs, Ill., assignor to Western Electric Company, Incorporated, New York, N. Y., a corporation of New York Application February 11, 1942, Serial No. 430,391

5 Claims. (Cl. 18—16)

This invention relates to a molding apparatus and more particularly to an apparatus for compression molding threaded articles.

In the usual molding apparatus for molding a threaded article where a threaded mold core is used to produce the threads, this core must, of course, be removed from the article by unscrewing the core. It has usually been necessary that the article be irregularly shaped or knurled in order to prevent it from rotating and thus interfering with the removal of the core.

It is an object of the present invention to provide an efficient and effective apparatus for automatic compression molding of threaded articles.

In one embodiment of this invention, a molding apparatus for molding internally threaded articles may be used comprising a resiliently-mounted sectional mold having a rotatable mold core and means for unscrewing the core prior to the opening of the mold so that the molded article will be prevented from rotating by the pressure of the mold on the article, the unscrewing of the core being effected before the mold is returned to the position from which it is opened.

Other advantages and objects will be apparent in the following detailed description taken in conjunction with the accompanying drawings wherein Fig. 1 represents a side elevation partly in section of the molding apparatus, the mold being open;

Figure 1:
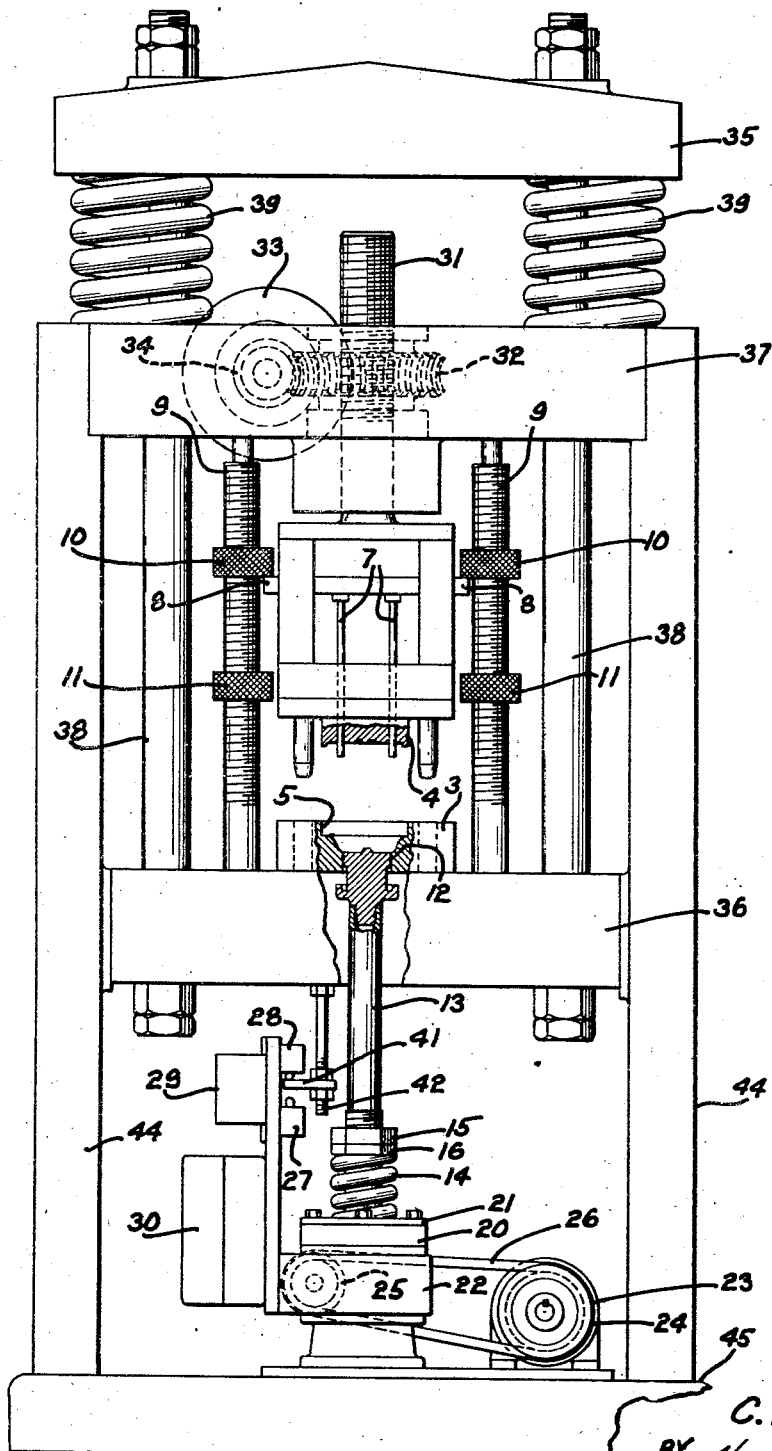
Figure 2:
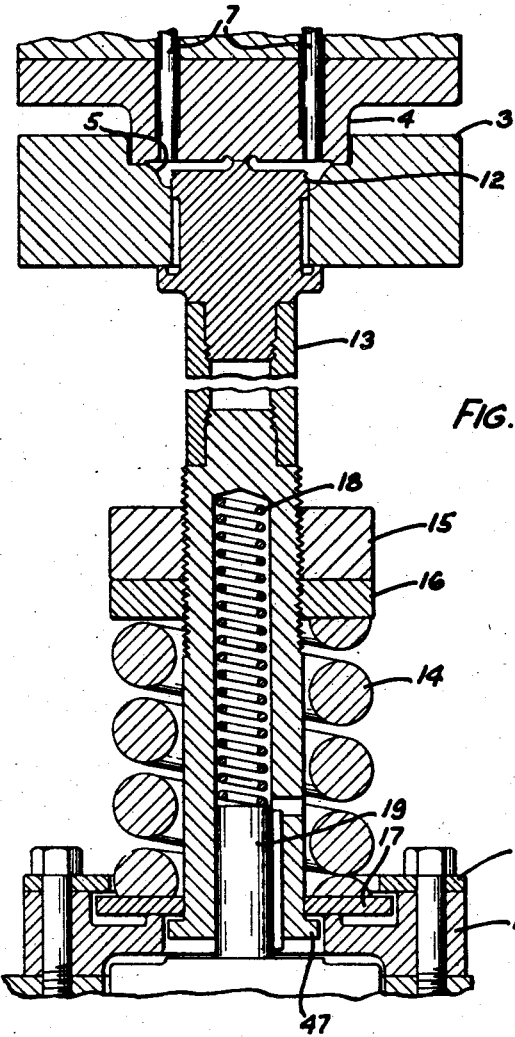
Fig. 2 is an enlarged sectional view of a part of the mold apparatus, with the mold closed.

The molding apparatus, as shown in Figs. 1 and 2 comprises a base 45 on which are rigidly mounted two standards 44. A cross-beam 37 is attached to the top of these standards and supports through springs 39 a cross-head 35. Cross-head 35 in turn supports the movable cross-beam 36 by means of rods 38 which pass through suitable apertures in cross-beam 37. A ram 31 is mounted in the center of the beam 37 and is provided with a gear 32 which is driven by a gear 34 mounted on the shaft of a motor 33. Means for controlling the operation of this motor are conventional and, therefore, are not shown.

The molding chamber is separable and comprises an upper section or force 4 mounted on the lower end of the ram 31, and a lower section 3, having a cavity 5, mounted on the cross-beam 36. Knockout pins 7 are adjustably fastened to a plate 8 which is suitably mounted in the force so that when the force is raised by the ram, the plate 8 comes into contact with upper nuts 10 which are adjustably mounted on threaded posts 9. Since the knockout pins are held stationary when the nuts 10 contact the plate 8, continued upward movement of the force will effectively eject a molded article from the force. On the other hand, when the force is moved downwards, the plate 8 contacts lower nuts 11 which are also adjustably mounted on the posts 9 and the pins are retracted so that their ends will be flush with the surface of the force when the mold is closed. These posts are rigidly secured to the beam 36 at their lower ends and their upper ends enter suitable apertures in the beam 37.

A threaded core 12 is set in the lower section of the mold in the cavity 5, and is connected to the mechanism at the base of the apparatus by a tubular column 13 having a flange 47 at its lower extremity. This column is suitably threaded to receive a nut 16 and lock nut 15 which rest on the upper end of a coil spring 14 and are used to adjust the load on this spring. The purpose of this spring is to permit the mold core to move downwards should the ram move too far or should something become jammed in the mold. As may be seen in Fig. 2, the lower portion of the tubular column 13 is hollow to receive spring 18 which rests on the upper end of a low-speed shaft 19 of a vertical type speed reducer 22. The lower end of this tubular column is designed to receive the shaft 19 and is suitably keyed thereto. Spring bumper block 20 and ring 21 hold a washer 17 which supports the lower end of spring 14. Space is provided for flange 47 to move downwards or upwards as the case may be, should the mold core and the column 13 be moved. As explained, the purpose of this spring is to prevent damage to the parts. Occasionally the ram motor will not be stopped exactly as planned but will move the mold slightly further. By mounting the mold core on the spring and providing room for the associated parts to move in, it has been found that such over-movement as occurs is compensated for and hence injury to the apparatus is avoided.

Fig. 1 shows the machine with the mold open to receive molding material from a suitable metering device. In this position plate 8 is in contact with the upper nuts and the knockout pins extend below the surface of the force 4 a sufficient distance to positively eject an article therefrom. The threaded portion of the mold core 12 is just below the bottom of the mold cavity 5. Molding material is then placed in the lower part of the mold, motor 33 is actuated and the ram 31 begins to move downward. Plate 8 contacts the lower nuts 11 and as the mold closes the knockout pins are retracted. The ram continues to move downwards after the mold is closed, thus causing the beam 36 and cross-head 35 connected thereto to move downward against the pressure of springs 39. Spring 14 is heavy enough so that the mold core 12 remains substantially stationary and thus, as the mold moves downward, the core will enter the mold cavity; and since the mold contains sufficient molding material to just fill the mold when the core is inserted in the mold, the material will be compressed so as to be threaded and to assume the shape of the mold. When the mold core has entered the required distance, that is, the distance necessary to produce the number of threads desired on the molded article, the downward movement of the mold is stopped by deenergizing the ram motor. Means for doing this are not shown. The closed mold and associated parts then occupy the relationship shown in Fig. 2. A suitable timing mechanism is employed to hold the mold closed a sufficient time to cure the molded material. At the termination of this predetermined curing period, during which the mold may be heated, the ram-driving means is reenergized to operate in the reverse direction.

As the mold is moved upwards by reversing the operation of the ram, the threaded core must be unscrewed from the molded article. The core is rotated by the shaft 19 of the speed reducer 22 which is driven by a motor 23 to which the reducer is connected by a V-belt 26 running over adjustable pulleys 24 and 25. The operation of this motor is controlled by micro-switches 27 and 28, relay 29 and magnetic switch 30 as will be explained in detail hereinafter. The speed of rotation of the mold core is carefully synchronized with the speed of upward movement of the mold by means of the adjustable pulleys 24 and 25 so that the molded article is withdrawn from the threaded core at the same rate as the threaded core is released from the molded article by being unscrewed, thus putting no undue pressure on the threads of the molded article. Since the mold remains closed until it has moved upwards the same distance it moves downwards while closed, it will be apparent that the molded article will be firmly held by the mold pressure. This pressure effectively prevents rotation of the article as the core is unscrewed even though the surface of the article is in no way roughened. Thus, smooth-surfaced threaded articles may be molded in this machine and the threading means removed automatically therefrom with no danger of the article rotating and consequently interfering with the removal of the threading means.

Figure 3:
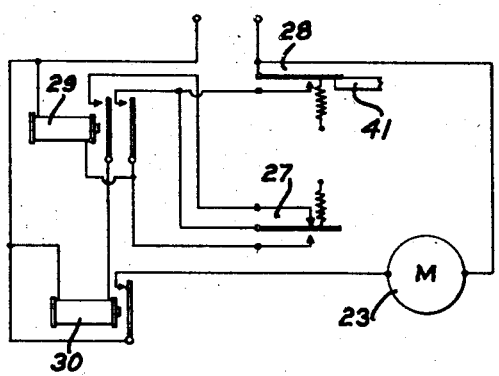
Fig. 3 is a schematic representation of a circuit used with this molding apparatus.

Power to the motor 23 is controlled through the switches 27 and 28, locking relay 29 and the magnetic switch 30. As may be seen in Fig. 1, a threaded rod 42 is mounted on the under side of the movable cross beam 36 and an arm 41 is adjustably mounted thereon and at right angles thereto. This arm operates the micro-switches 27 or 28 depending on the position of the cross-beam 36. When the mold is fully opened, micro-switch 28 is contacted by the arm 41 and is opened. This is the position shown in Fig. 1. As may be seen in Fig. 3, which shows the circuit used, opening micro-switch 28 breaks the circuit to the magnetic switch 30 which in turn stops the motor 23. At the same time it opens the relay 29. Relay 29 and micro-switches 27 and 28 must all be closed to actuate magnetic switch 30. Thus, it will be apparent that opening relay 29 by the actuation of switch 28 prevents the circuit from being completed again until this relay is closed even though switch 28 be closed, since closing switch 28 does not close relay 29. The closing of relay 29 may be accomplished only through switch 27. As the beam 36 travels downward, the arm 41 moves away from switch 28, and switch 28 closes. Arm 41 then contacts switch 27 which, as aforesaid, closes relay 29, but, since in energizing relay 29, the circuit to magnetic switch 30 is opened simultaneously by switch 27, the circuit to the motor is not completed. It will be obvious that if this were not done the motor 23 would be actuated as soon as relay 29 closed and the mold core would rotate before the upward movement of the mold began. Instead, when the mold is completely closed and the ram has moved downwards its full distance of travel, the switch 28 is closed, relay 29 is closed by the switch 27, but magnetic switch 30 is open and hence no power is supplied to the motor 23.

As the ram moves the associated parts upwards, switch 27 operates and closes the circuit to magnetic switch 30. Relay 29 is locked closed now by the circuit through the closed switch 28. Closing the magnetic switch 30 operates the motor 23. Motor 23 will then continue to operate until its circuit is broken by arm 41 contacting switch 28 and breaking both the power circuit to the motor and the locking circuit to relay 29.

Because the force 4 presents a substantially greater surface to the molded article, the molded article will adhere to the surface of the force instead of the lower part of the mold and will be completely removed from the mold cavity by the upward travel of the force. As the upward movement continues, the plate 8 contacts nuts 10 and the knockout pins are then actuated, thus ejecting the molded article from the force. An air blast may then be used to remove the molded article from the apparatus as it drops from the force. Means for doing this are conventional and are no part of the present invention. As the ram moves upwards, the springs 39 return cross-head 35 and beam 36 to their positions before pressure was applied by the ram. The upward travel of the ram is stopped when a switch (not shown) deenergizes the ram-driving means, thus completing the cycle of operation.

While the foregoing describes a mechanism for producing a particular internally threaded part, the design is equally applicable to other externally or internally threaded parts, and it will be understood that the nature and embodiment of the invention herein described is merely illustrative and many changes and modifications may be made therein without departing from the spirit and scope of the present invention.

What is claimed is:

1. An apparatus for compression molding a threaded article including a sectional mold, a rotatable, threaded mold core, means for clamping the sections of said mold together to close said mold, means for moving said mold, a motor for rotating said core, a current supply for said motor, a magnetic switch for controlling the energization of said motor, a double pole relay associated with said magnetic switch for controlling the energization of said magnetic switch, a normally closed single contact switch connected to said current supply, said switch being operable to deenergize said relay a double contact switch normally biased to complete a circuit from said single contact switch to said magnetic switch but movable to open said circuit and to energize said relay, a holding circuit completed by the energizing of said relay when said single contact switch is closed for holding said relay closed as said double contact switch returns to its normal biased position, a second circuit prepared by the energizing of said relay, said second circuit connecting the magnetic switch to the double contact switch, and means operable in response to the movement of said mold for alternately actuating said single contact switch and said double contact switch.

2. An apparatus for molding threaded articles comprising a mold section, a resilient support therefor, a rotatably mounted threaded core receivable in said resiliently mounted mold section, a second mold section movable toward said resiliently mounted mold section to close the mold, means for moving said movable mold section toward said resiliently mounted mold section to close the mold, compress the support and to cause said rotatable core to move into said resiliently mounted mold section, means for reversing the movement of said movable mold section whereby said resilient support will retain the mold closed during a predetermined portion of the movement of said movable mold section, and means for rotating said core to unthread it from a molded article while the mold is closed during said reverse movement.

3. An apparatus for compression molding a threaded article including a sectional mold, a rotatable, threaded mold core, means for clamping the sections of said mold together to close said mold, means for moving said mold sections, a motor, a motor control circuit including a single contact and a double contact switch operable in response to movement of one of said mold sections, a magnetically operated switch for energizing said motor, a holding circuit for said magnetically operated switch energized by the actuation of said double contact switch, means for energizing said magnetically actuated switch upon the actuation of said double contact switch, said motor being deenergized upon the actuation of the single contact switch.

4. In an apparatus for molding a threaded article, a separable molding die having an upper and a lower section, a resilient support for said lower section, a rotatable threaded mold core receivable in said lower section, said cone being substantially stationary in a longitudinal direction reversible means for moving said upper section with respect to said lower section to clamp said sections together and to move said sections as a unit against the pressure of said resilient support to cause said core to enter said lower section, and means for rotating said core to unthread said core from said article during the reverse movement of said mold moving means and while the die is closed.

5. In an apparatus for molding a threaded article, a separable molding die having an upper and a lower section, a resilient support for said lower section, a resiliently mounted rotatable threaded mold core substantially stationary in a longitudinal direction receivable in said lower section, reversible means for moving said upper section with respect to said lower section to clamp said sections together and to move said sections as a unit against the pressure of said resilient support to cause said core to enter the lower section, and means for rotating said core to unthread said core from said article during the reverse movement of said mold-moving means and while the die is closed.

CLARENCE E. McCOY.